United States Patent [19]

Pages et al.

[11] Patent Number: 5,107,901
[45] Date of Patent: Apr. 28, 1992

[54] MODULATOR MECHANISM FOR DOBBY

[75] Inventors: Jean-Pierre Pages; André Fumex, both of Faverges, France

[73] Assignee: S. A. Des Etablissements Staubli (France), Faverges, France

[21] Appl. No.: 663,180

[22] Filed: Mar. 1, 1991

[30] Foreign Application Priority Data

Mar. 6, 1990 [FR] France .................... 90 03068

[51] Int. Cl.⁵ .............................................. D03C 1/12
[52] U.S. Cl. ........................................ 139/76; 475/14
[58] Field of Search ................ 139/76, 66 R; 475/14, 475/17

[56] References Cited

U.S. PATENT DOCUMENTS

| | | | |
|---|---|---|---|
| 3,407,678 | 10/1968 | Steinke . | |
| 4,326,563 | 4/1982 | Brock et al. | 139/76 |
| 4,393,902 | 7/1983 | Brock | 139/76 |
| 4,924,915 | 5/1990 | Vinciguerra | 139/76 |

FOREIGN PATENT DOCUMENTS 2478143 9/1981 France .

OTHER PUBLICATIONS

*Machine Design,* Federico Strasser, Controlling Motion with Cams, Jan. 8, 1987, p. 128.

*Primary Examiner*—Andrew M. Falik
*Attorney, Agent, or Firm*—Dowell & Dowell

[57] ABSTRACT

A modulator mechanism for actuating textile dobbies in looms which include a cage driven in rotation by the drive shaft of the loom and which have at least two oscillating supports provided with rollers which roll in contact with a fixed cam which is connected to the principal shaft of the dobby. Connecting rods are pivotally attached to the supports and to a web fixed to the dobby shaft so that the dobby shaft is intermittently driven in rotation as the connecting rods are oscillated by the supports.

1 Claim, 5 Drawing Sheets

MODULATOR MECHANISM FOR DOBBY

BACKGROUND OF THE INVENTION

1. Field of the Invention

The present invention relates to dobbies of the rotary type for a weaving loom and more particularly to the modulator mechanisms interposed between the shaft of the loom and the principal shaft of the dobby in order to intermittently drive the dobby with a stop every 180°.

2. History of the Related Art

Different types of modulator mechanisms for rotary dobbies have been proposed, certain known constructions faithfully reproducing intermittent drive systems used in other technical sectors.

Reference will firstly be made to French Patent No. 2 478 143 to STAUBLI, of which the mechanism is schematically recalled in FIG. 1 of the accompanying drawings. The mechanism described essentially comprises a rotating cage which is formed by an entry plate 1 and a disc 2 connected to each other by two longitudinal pins 3 and which is mounted idly on the principal shaft 4 of the dobby, being driven in rotation by the shaft of the weaving loom. The shaft 4 freely traverses a fixed cam 5 of the complementary type of which the two constituent discs are rigidly fixed to the housing of the dobby; against this cam 5 are applied two pairs of rollers 6, each pair being mounted on a support 7 which oscillates freely on one of the two pins 3. The articulated link between each oscillating support 7 and the shaft 4 is ensured by a block 8 which moves inside a radial slideway 7a of the support and which is pivotally carried by two webs 9 fixed with shaft 4 so has to act as a drive rod.

Another known type of modulator mechanism is illustrated in U.S. Pat. No. 3,407,678 to STEINKE, and is schematically recalled in FIG. 2 of the accompanying drawings. Here, the control rollers are replaced by pinions 16 which are idly mounted on shafts 13 rotatably supported by a plate 12, which is fitted on the shaft 11 of the loom. Each pinion 16 meshes with a ring gear 15 rigidly fixed to the fixed housing of the dobby, so that each shaft 13 is driven in rotation. Each shaft 13 comprises an extension 17 offset with respect to the axis thereof, and the link between each extension 17 and the principal shaft 14 of the dobby is provided by a connecting rod 18 coupled on a web 19 fitted on the shaft 14.

More recently, an arrangement has been proposed which in fact derives directly from the two systems recalled above. As illustrated very schematically in FIG. 3, this arrangement again employs two pairs of rollers 26 mounted on two opposite supports 27 which oscillate about pins 23 in order that the rollers ride on a fixed complimentary cam 25. The link between each support 27 and the shaft 24 of the dobby is provided, as in the U.S. Patent mentioned hereinabove, by a connecting rod 28 coupled, on the one hand, on a lateral pin 27a of the support 27, and on the other hand, on a web 29 fitted on the shaft 24.

It will be understood that, for such an arrangement to function correctly, ensuring perfect balance of the forces which are exerted, on the two oscillating supports 27 of the system, it is imperative that the two oscillating supports and the parts which connect them to the shaft 24 of the dobby, are absolutely identical in geometry, any error, even slight, in dimensioning or geometry rendering it impossible for the four rollers 26 to ride simultaneously on the two tracks of the complementary cam 25; in that case there is only one oscillating support which is working, which creates unacceptable lack of balance and overload. Now, it is known that, in practice, it is difficult systematically to avoid any defect in mass-production.

SUMMARY OF THE INVENTION

It is an object of the present invention to provide a modulator mechanism for actuating textile dobbies of the rotary type, interposed between the shaft of a loom with continuous circular movement and the principal shaft of the dobby in order to drive the dobby in a discontinuous circular movement with a time of stop every 180°. The mechanism comprises, in known manner, a cage driven in rotation by the shaft of the loom and equipped with at least two opposite oscillating supports of which each, provided with two rollers which roll in contact with the two discs of a fixed complementary cam, is connected to the principal shaft of the dobby by a connecting rod coupled, on the one hand, to the support, and on the other hand, to a web secured with the principal shaft, and wherein the point of coupling of the connecting rod on the corresponding support merges with the pin on which is mounted one of the two rollers of the support.

In fact, the invention essentially consists, in the manner illustrated very schematically in FIG. 4 of the accompanying drawings, in effecting coupling of each connecting rod 38 with the oscillating support 37 at the pin 37a provided on the support 37 for mounting one of the two rollers 36.

Without mentioning the saving made by eliminating one of the four bores provided on each support according to the system illustrated in FIG. 3, it will be readily appreciated that the merging or coincidence of the point of coupling of the connecting rod on the oscillating support with the pin for mounting one of the two rollers thereof, avoids any detrimental consequence resulting from an error in geometry and any possibility of imprecision.

BRIEF DESCRIPTION OF THE DRAWINGS

The invention will be more readily understood on reading the following description of the modulator mechanism according to the invention illustrated in the accompanying drawings, in which.

DESCRIPTION OF THE PREFERRED EMBODIMENT

Figure 1:
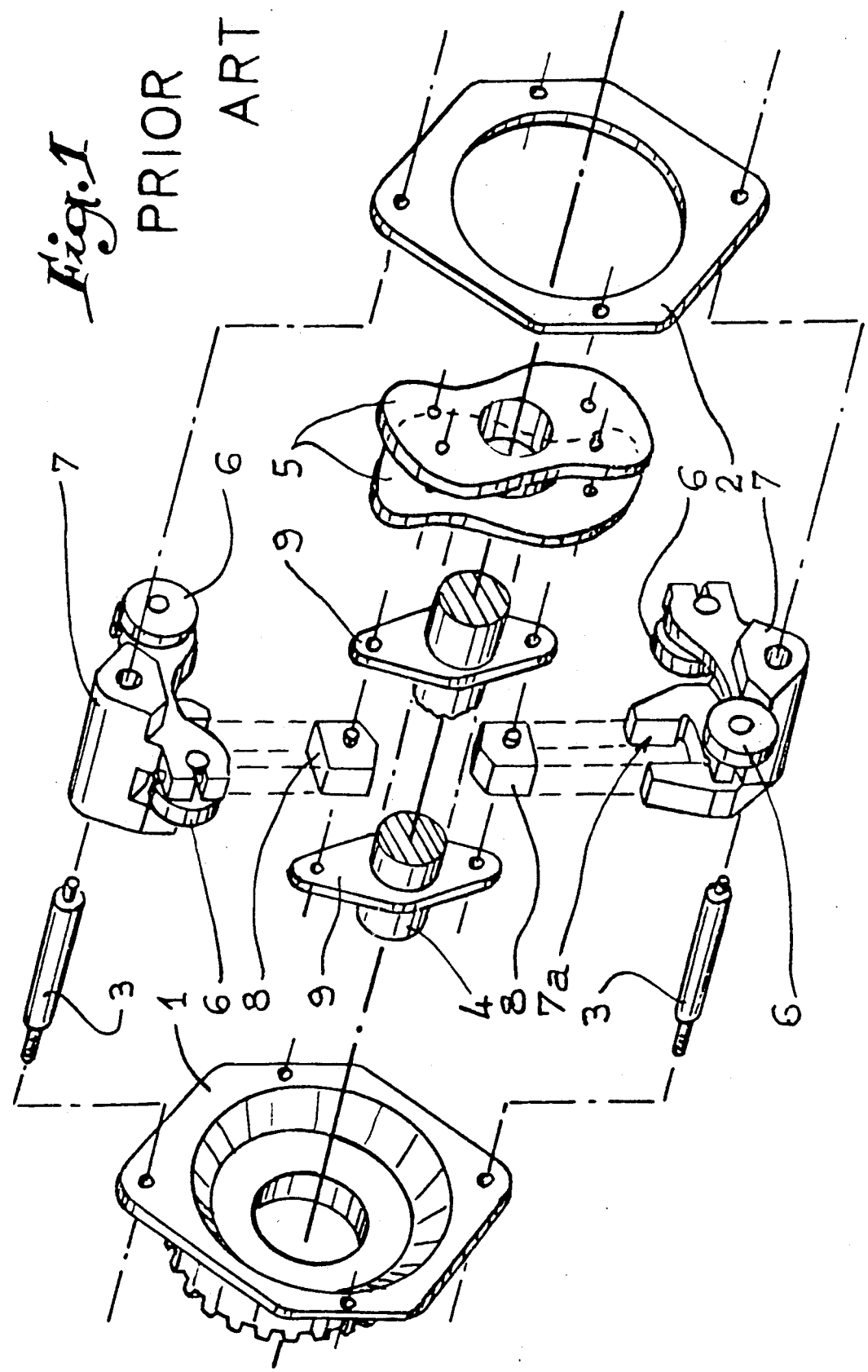
FIG. 1 is a perspective view showing the parts of a modulator mechanism according to French patent 2,478,134.
Figure 2:
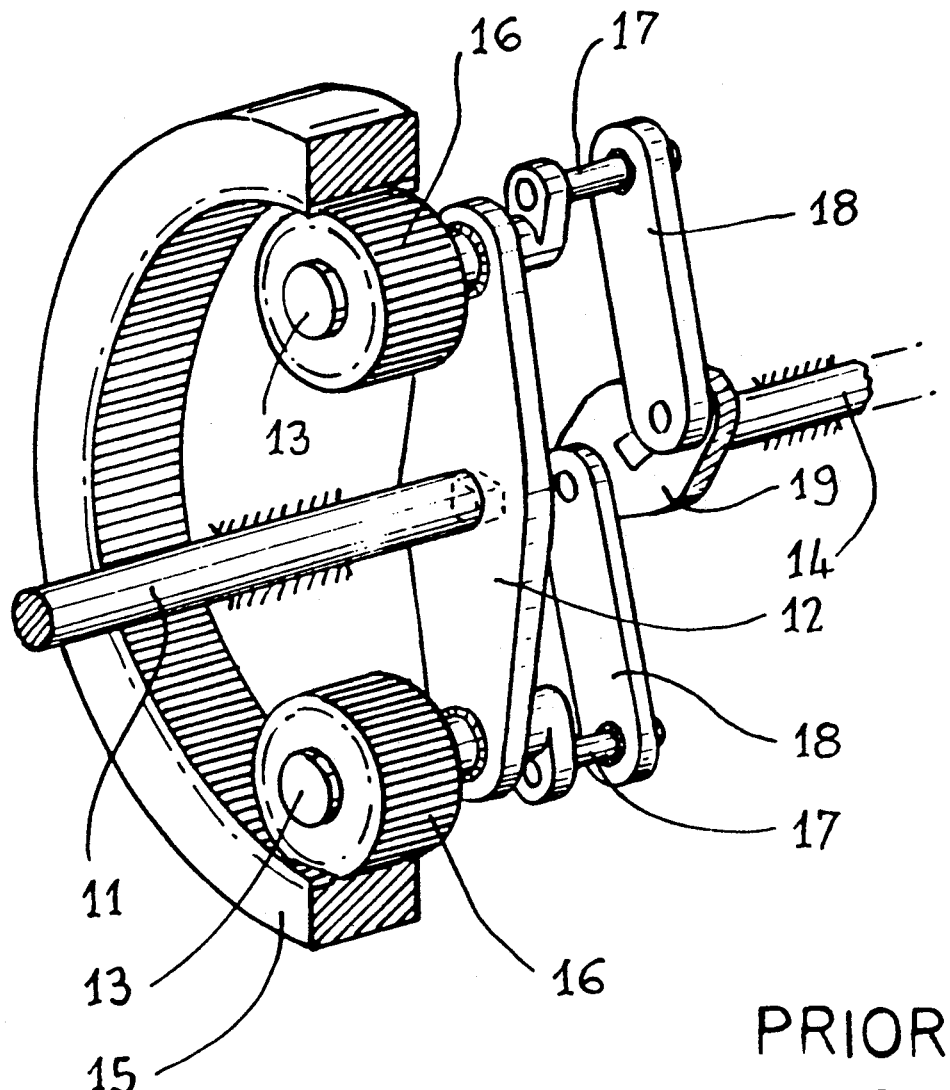
FIG. 2 shows in perspective the structure of the mechanism according to U.S. Pat. No. 3,407,678.
Figure 3:
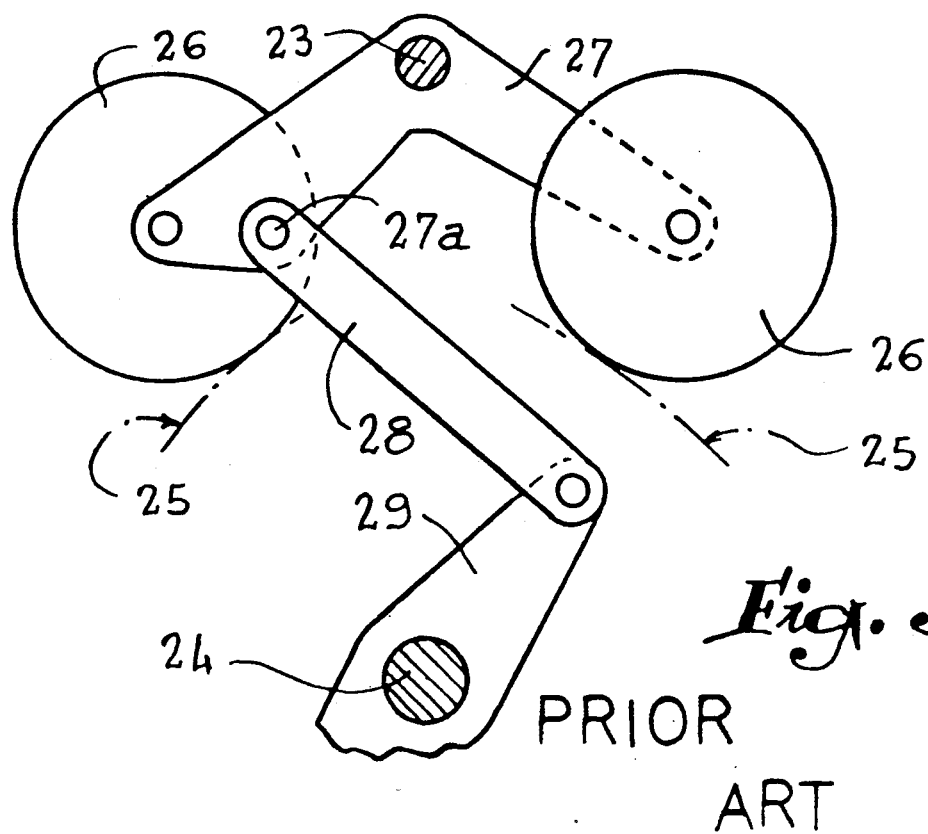
FIG. 3 is a cross-sectional schematic view of another prior art structure.
Figure 4:
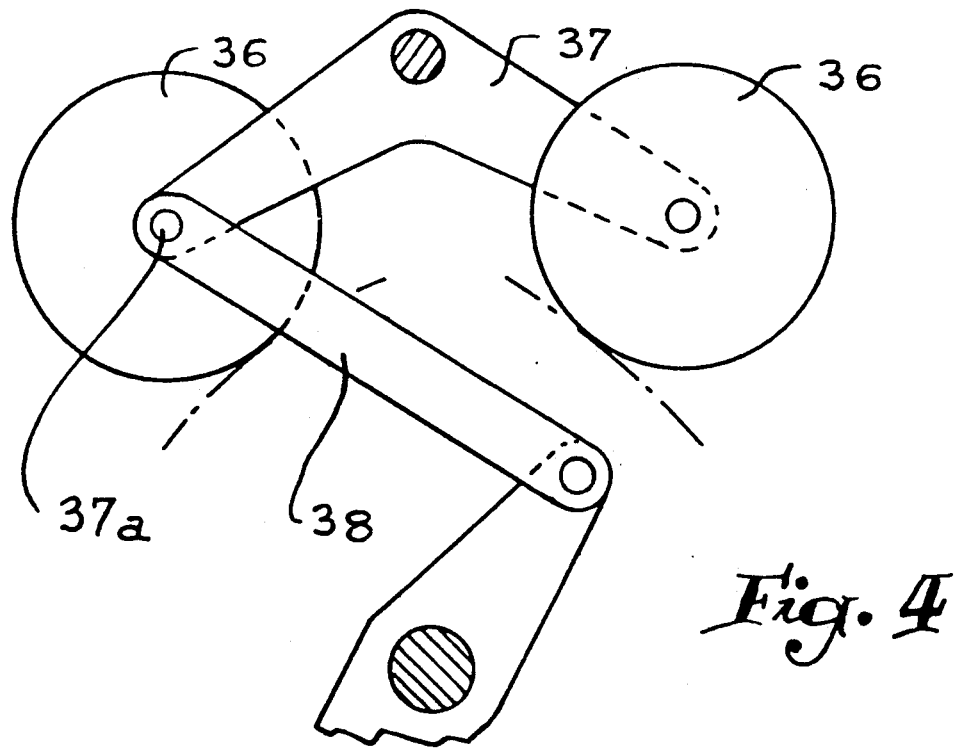
FIG. 4 is a cross-sectional schematic view of the control mechanism of the present invention.
Figure 5:
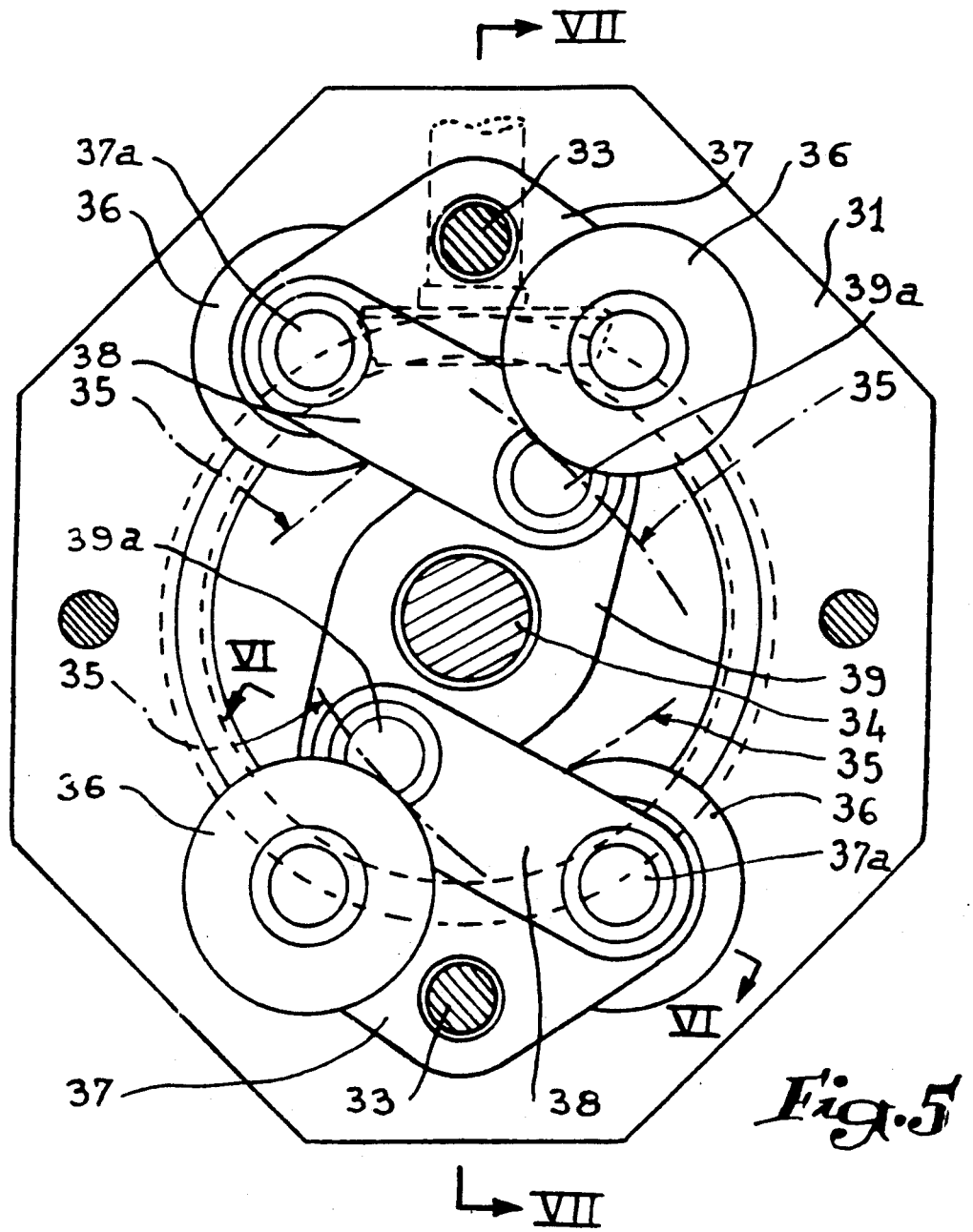
FIG. 5 is a vertical section showing the arrangement of the mechanism according to the invention.
Figure 6:
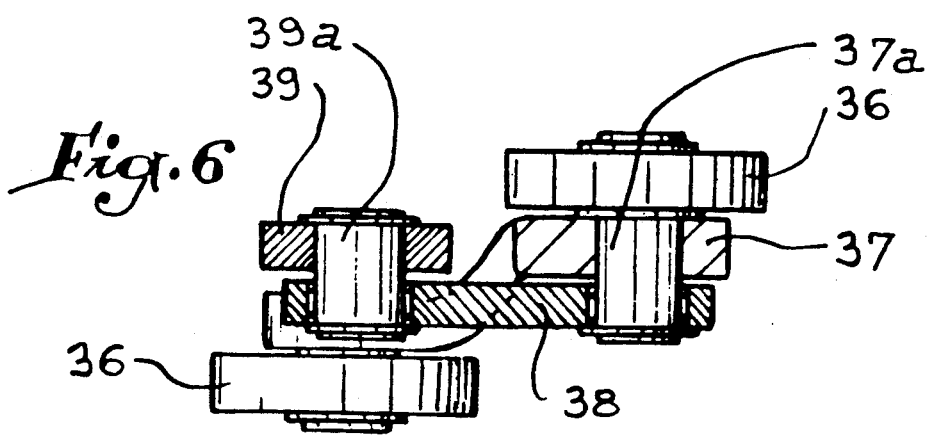
FIG. 6 is a section of a detail along plane VI—VI of FIG. 5.
Figure 7:
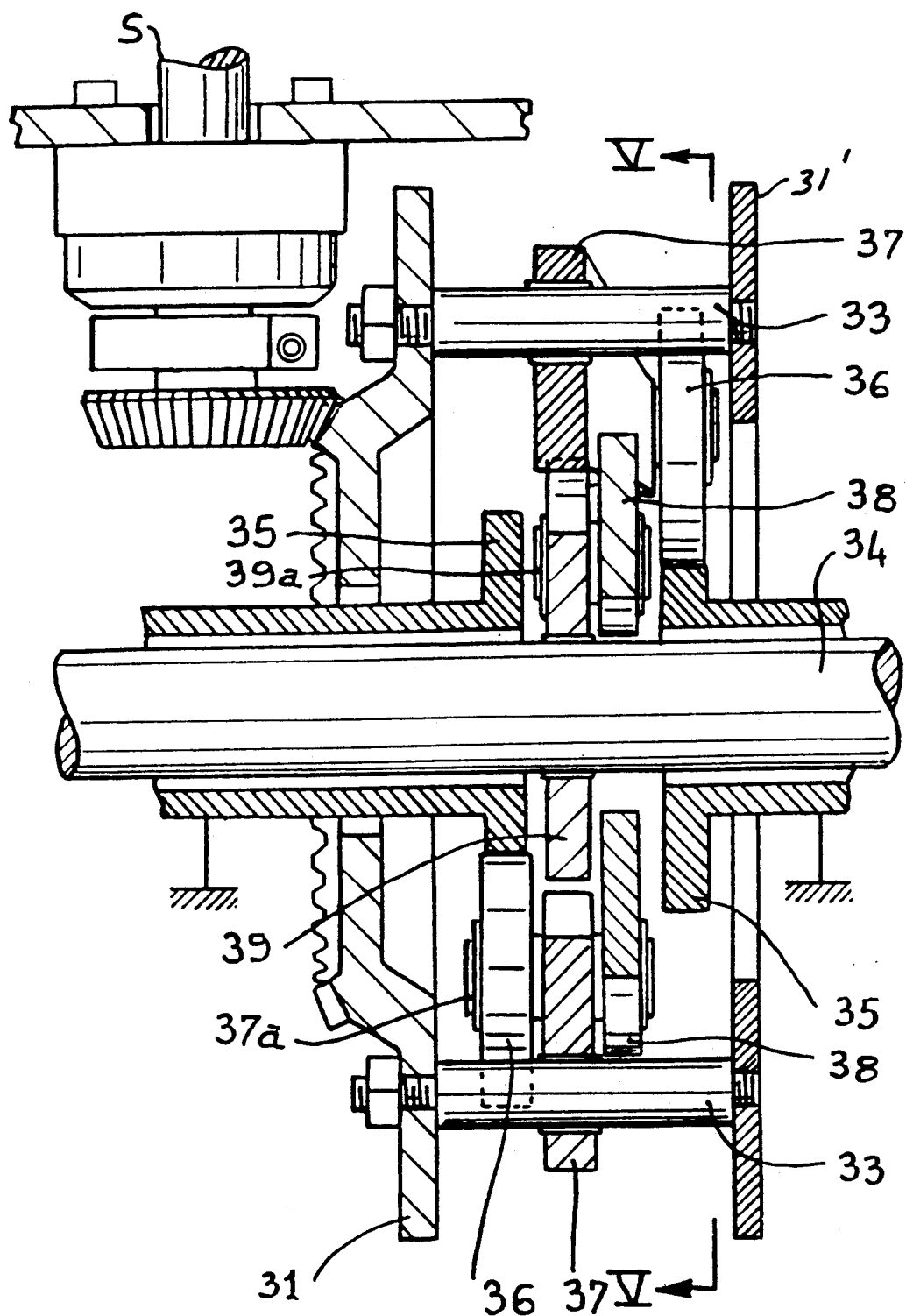
FIG. 7 is a partial cross-sectional view taken along line A—A of FIG. 5.

Referring again to the drawings, in FIGS. 4–7, reference 31 designates the entry late or disc which is connected by the two opposite pins 33 to an opposing plate on disc 31 to constitute a rotating cage similar to the one described with reference to FIG. 1. As previously discussed, the cage is rotated, in the same manner as disclosed in French patent 2,478,143, by the shaft S of the loom by way of intermeshing gears G1 and G2. The gear G2 is provided along the backside of the age entry plate 31. On each of the two pins 33 oscillates one of the two supports 37 equipped with rollers 36 adapted to roll on the profiled discs of the fixed cam 35. The profiled discs of the cam include profiled outer surfaces which are shaped to cause the dobby shaft 34 to cease rotation at approximately every 180° of its rotation. As is more particularly visible in FIG. 6, each connecting rod 38 is articulated, on the one hand, on a lateral pin 39a carried by the web 39 fitted on the principal shaft 34 of the dobby, and on the other hand, on one of the two pins or shaft means 37a provided on the support 37 for mounting the idle rollers 36.

Operation is identical to that of the modulator mechanism according to FIG. 1, in that the oscillation of the two supports 37 imparts, via the connecting rods 38, to the shaft 34 the desired discontinuous movement. As loom shaft S continuously rotates, the cage and pins 33 are rotated thereby driving the supports 37 and rollers 36 along the profiled discs of the cam 35. As the rollers follow the profile of the discs, the supports 37 will oscillate and such movement is transmitted through the connecting rods 38 to the web 39 which is secured to the dobby shaft 34 to thereby intermittently stop the rotation of the shaft 34 based upon the profile of the cam surface. As has been set forth hereinabove, the articulation of each connecting rod 38 on one of the pins 37a supporting the rollers 36 ensures in all cases the balancing of the efforts which are exerted on the two supports 37.

It goes without saying that the invention is applicable to modulator mechanisms comprising more than two oscillating roller-bearing supports.

What is claimed is:

1. In a modulator mechanism for actuating textile dobbies of the rotary type and which is interposed between the drive shaft of a loom and the principal shaft of the dobby in order to drive the dobby shaft in a discontinuous rotary movement with a stop at approximately every 180° and which mechanism includes a cage driven in rotation by the drive shaft of the loom and which cage carries at least two oppositely disposed oscillating supports each of which is provided with rollers which roll in contact with two discs of a fixed complementary cam and is connected to the principal shaft of the dobby by a connecting rod coupled to the support and a web fixed to the principal shaft of the dobby, the improvement comprising, each roller being mounted by a shaft means to the oscillating supports, and each connecting rod having a first end pivotally connected to the web and a second end pivotally connected to one of said shaft means so that said second end of said connecting rod is pivotal about a common axis with one of the rollers of the oscillating supports.

* * * * *